Aug. 13, 1935.  H. A. ROBINSON, SR  2,011,161
TANK TRAILER
Filed July 11, 1933    3 Sheets-Sheet 1
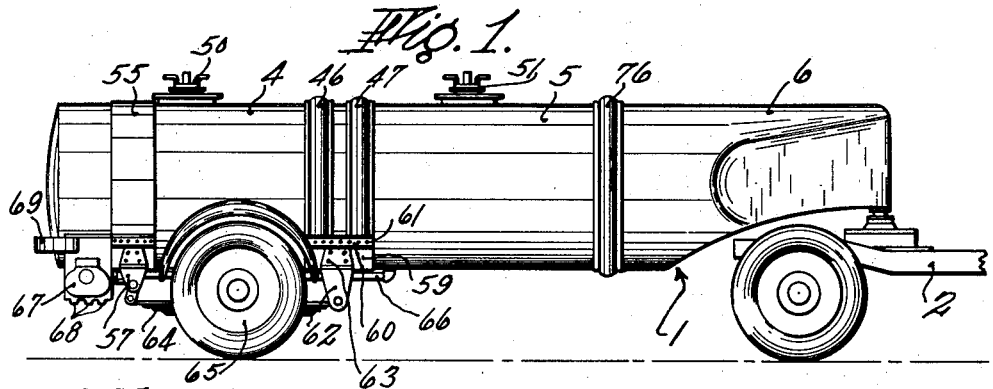
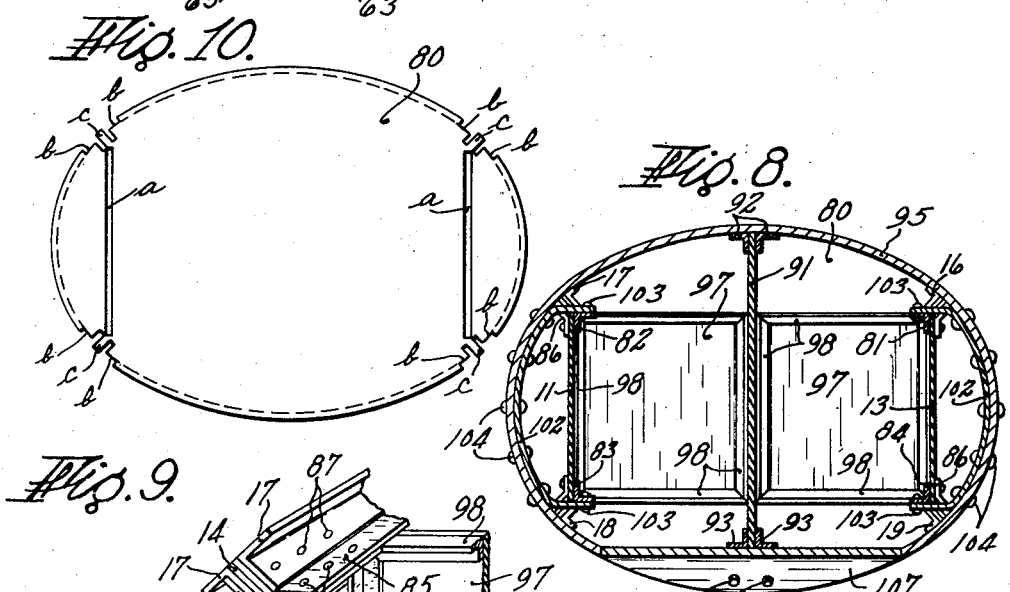
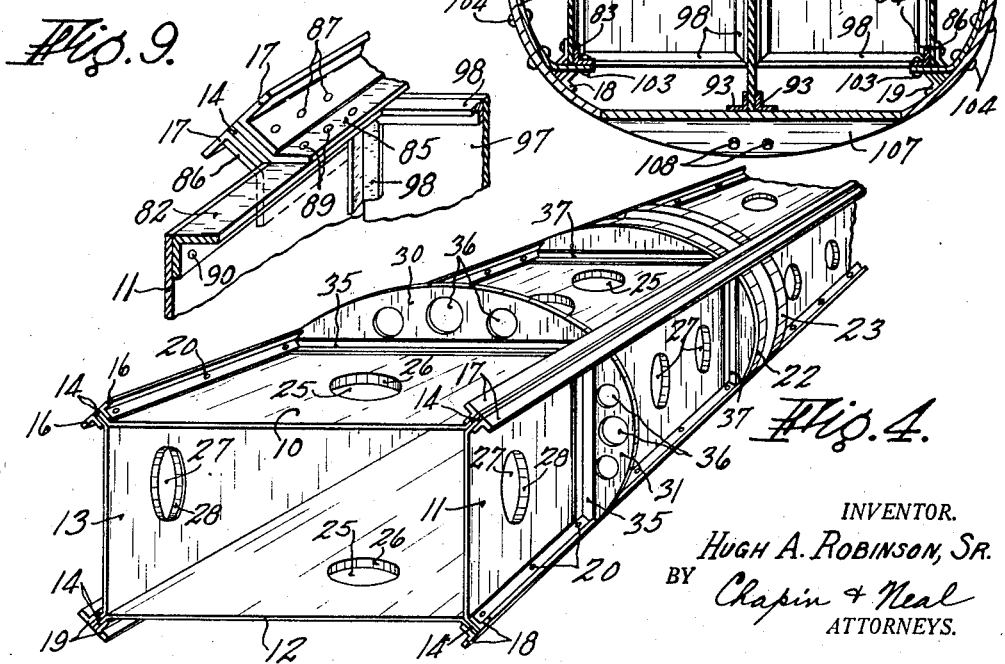
INVENTOR.
HUGH A. ROBINSON, SR.
BY Chapin & Neal
ATTORNEYS.

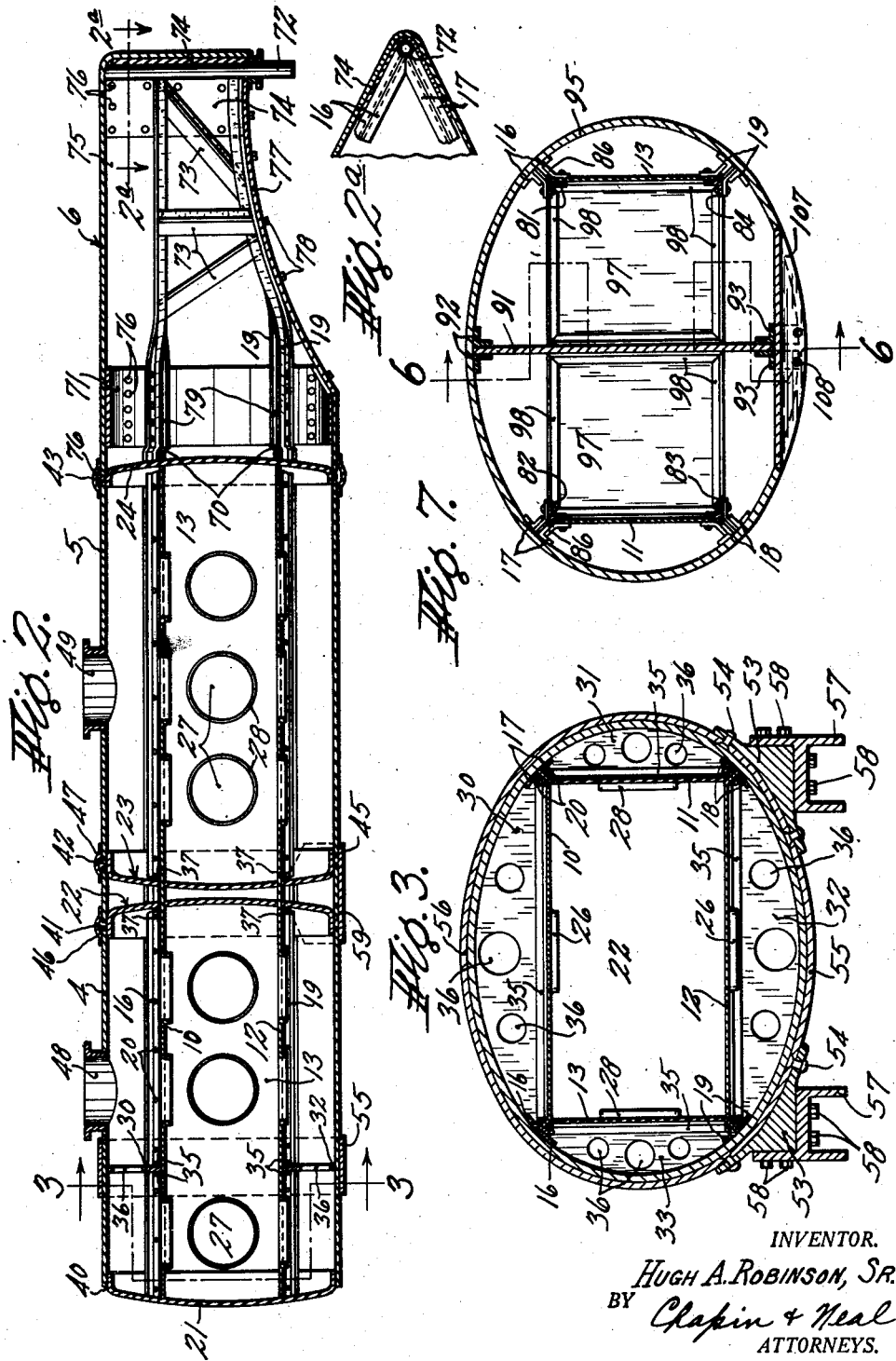

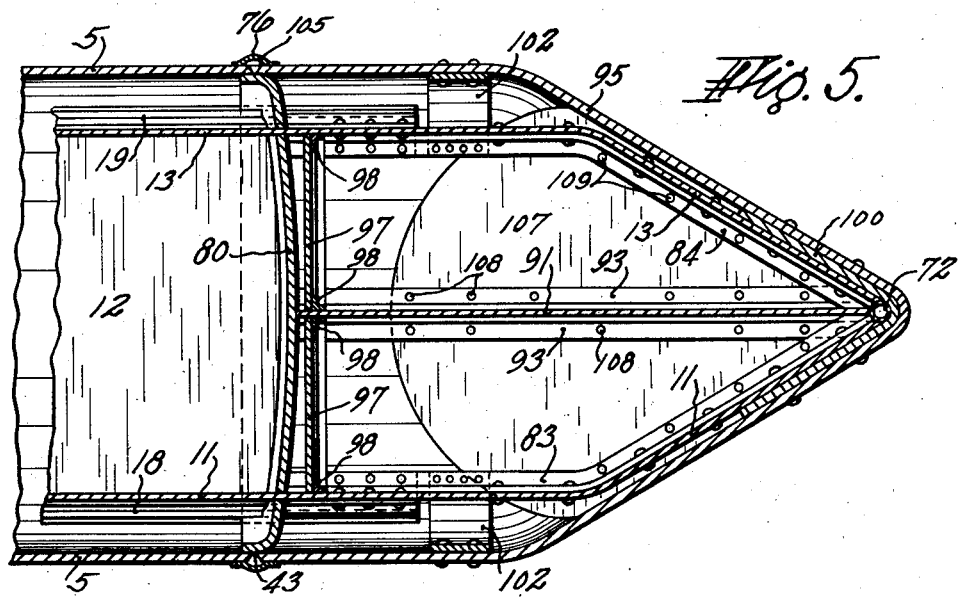
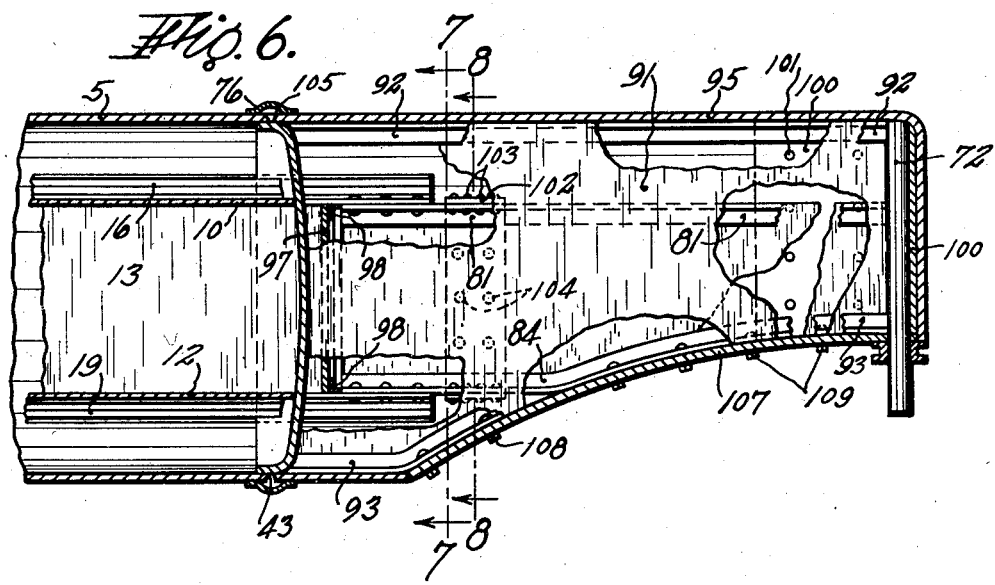

Patented Aug. 13, 1935

2,011,161

UNITED STATES PATENT OFFICE 2,011,161

TANK TRAILER

Hugh A. Robinson, Sr., Coral Gables, Fla., assignor to Curtiss Aerocar Company, Inc., Coral Gables, Fla., a corporation of Florida Application July 11, 1933, Serial No. 679,884

11 Claims. (Cl. 280—5)

This invention relates to tank vehicles of the type disclosed in co-pending application Ser. No. 679,883 filed July 11, 1933, and is in the nature of an improvement on the construction disclosed in said application.

In this type of vehicle a frame enclosed within the tank is so constructed as to serve both as a reenforcement for the tank and as the chassis of the vehicle. The mountings of the vehicle wheels are secured directly to the tank shell and the frame is so arranged within the tank, and the wheel mountings are so positioned with respect to the frame members that although the tank wall intervenes between the frame and the wheel mounting the load and the strains incident to propelling the vehicle are properly sustained by the frame and transmitted between the frame and wheels.

It is the general object of the present invention to provide an improved frame and tank structure possessing greater strength without that proportionate increase in weight which would result if conventional methods of strengthening the frame were resorted to; to secure an increased efficiency in the functioning of the parts and to attain economies in manufacture.

A further object is to provide a construction permitting the combination of steel and aluminum in the construction of the tank and frame to thereby secure a lighter vehicle without sacrificing strength where strength is necessary or desirable.

Other and further objects will be apparent from the following specification and claims.

In the accompanying drawings which illustrate one embodiment of my invention:

Fig. 1 is a side elevation of a tank trailer made according to the invention together with the rear portion of a tractor vehicle;

Fig. 2 is a vertical longitudinal central section of the body of the vehicle, on a larger scale, the wheels being omitted;

Fig. 2a is a fragmentary section substantially on line 2a—2a of Fig. 2;

Fig. 3 is a section substantially on line 3—3 of Fig. 2;

Fig. 4 is a perspective view of the rear portion of the frame;

Fig. 5 is a horizontal sectional view of the nose portion of the vehicle modified to use a combination of aluminum and steel in its construction;

Fig. 6 is a vertical sectional view substantially on line 6—6 of Fig. 7, parts being broken away;

Fig. 7 is a sectional view substantially on line 7—7 of Fig. 6;

Fig. 8 is a sectional view substantially on line 8—8 of Fig. 6;

Fig. 9 is a fragmentary perspective view looking toward the rear showing the manner of joining certain of the steel and aluminum members; and Fig. 10 is a front view of the forward tank head employed in the construction illustrated in Figs. 5 to 9.

Referring to Figs. 1 to 4 inclusive, I designates generally a tank vehicle in the form of a semi-trailer, the rear portion of a suitable tractor being shown in Fig. 1 at 2.

The body of the tank trailer illustrated comprises two tank sections, designated 4 and 5, and a nose section 6. Positioned within the body of the trailer is a frame which serves both to reenforce the tank and as a vehicle chassis. As best shown in Figs. 2, 3 and 4, this frame comprises a fabricated box girder, and in the embodiment shown is constructed of four longitudinal plate members 10, 11, 12 and 13. These plates are provided with flanges 14 and are assembled in a box-like arrangement with the flanges of the adjacent plates back to back and held between pairs of angle irons 16, 17, 18 and 19 by rivets 20. The plate members 10, 11, 12 and 13 extend from the rear head 21 of tank section 4 to the forward head 24 of tank section 5, passing through forward head 22 of tank section 4 and rear head 23 of tank section 5. The ends of the plates are preferably, though not necessarily, welded to heads 21 and 24. The angle irons 16, 17, 18 and 19 extend through head 24 into the prow portion 6 as later described.

Plates 10 and 12 are provided with openings 25 to permit passage of the liquid within the tank, the holes being preferably provided with downwardly extending flanges 26 to stiffen the plates. Plates 11 and 13 are provided for the same reasons with similar openings 27 having inwardly extending flanges 28.

Adjacent the rear end of tank section 4 and in position to align with members of the wheel mountings, later described, vertical segmental plates 30, 31, 32 and 33 (see Figs. 2 and 3) are welded to plates 10, 11, 12 and 13, respectively. These plates, as is clear from Fig. 3, are cut at their ends to closely fit about the flanges of angle irons 16, 17, 18 and 19 to which they are welded. The connections of the segmental plates 30, 31, 32 and 33 to the box plates 10, 11, 12 and 13 are reenforced by angle irons 35 welded to the box plates and to the segmental plates and to the angle irons 16, 17, 18 and 19. The outer edges of the segmental plates conform to the inner cylindrical surface of the tank section, and are provided with openings 36 to permit passage of the liquid while acting to prevent surging of the liquid.

The intermediate tank heads 22 and 23 are formed in pieces which are welded to plates 10, 11, 12 and 13 and angles 16, 17, 18 and 19, and these connections are reenforced by angles 37 welded to the head pieces and plates in a manner similar to that just described with respect to angles 35.

The assembly of the structure so far described is completed before the tank shells 4 and 5 are put in place. This permits a maximum use of welding as the means for connecting the members together. The tank shell is shown as composed of sections 4 and 5 which are telescoped endwise over the frame and the respective ends welded to the heads 21, 22, 23 and 24 as indicated at 40, 41, 42 and 43, respectively. The space between the heads 22 and 23 is bridged by a band 45 the edges of which may be secured to the flanges of the heads by the welding operations at 41 and 42. The welds 41 and 42 are preferably concealed by beadings 46 and 47 respectively, spot welded to the tank shells.

Access to the interior of the tank is provided by man-holes 48 and 49 which are provided (Fig. 1) with suitable closures 50 and 51.

Mountings for the wheels are secured to the outside of the tank. Spring hanger brackets 53 (see Fig. 3) are secured by rivets 54 to a band 55 encircling the tank. The ends of band 55 are welded together at 56 and the band is itself welded to the tank. The band 55 is positioned as best shown in Fig. 2 concentric with the assembly of segmental plates 30, 31, 32 and 33 and these plates serve to transmit the operating and load strains between the wheel mountings and the frame. Spring hangers 57 are bolted to brackets 53 at 58. A saddle member 59 is welded to the tank forward of the band 55. Saddle 59 is in line with the intermediate tank heads 22 and 23, the latter serving to transmit the operating and load strains between the wheel mounting and the frame in a manner similar to the segmental plate assembly. The beadings 46 and 47 are cut away at the bottom portion of the tank to accommodate the saddle member 59 which, as is clear from Fig. 2, replaces the beading as the cover for welds 41 and 42 at that portion. Spring hanger brackets 60 (Fig. 1) similar to brackets 53 are riveted to the saddle at 61 and spring hangers 62 are bolted at 63 to the brackets. Springs 64 are connected to the hangers 57 and 62 and wheels 65 are carried by the springs, the connection of the springs to the hangers and of the wheels to the springs being made in any conventional or suitable manner.

The usual piping 66, meter 67 and outlet 68 are provided for dispensing liquid such as gasoline from the tank.

The rear end of the vehicle may be provided with the usual bumper 69.

The longitudinal frame member angles 16, 17, 18 and 19, as previously stated, extend through head 24. Beyond head 24 these frame member angles are inwardly offset as shown at 70 (Fig. 2) to accommodate a band 71, riveted thereto, and are then twisted to bring their outer flanges into horizontal planes, as best shown in Fig. 2, and are converged to a mitered joint at vertical post 72 to which they are welded. The lower end of post 72 serves as one member of a fifth wheel coupling by which the trailer is connected to the tractor. The lower members 18 and 19 are curved upwardly as shown in Fig. 2 to elevate the point of connection to the tractor. Suitable braces 73 welded at their ends to the angle members give rigidity to the frame within the nose portion and serve to distribute the draft strains to the frame as a whole. A V-shaped plate 74 is fitted around and welded to post 72 and the frame. Band 71 and plate 74 serve as means of attachment for the nose housing 75 which is held by rivets 76 to the plate and band. The rear edge of the housing 75 is welded to the forward tank head 24 by a welding operation similar to 43 and this joint is covered by a beading 76 spot welded to the tank shell and housing. Housing 6 is open at the underside of the nose and this opening is covered by a curved plate 77 secured to angle members 18 and 19 by bolts 78.

Since the plates 10, 11, 12 and 13 stop at the forward tank head the space between the angle members previously occupied by the plate flanges is left vacant in the nose portion and this space may be filled with strips 79.

In Figs. 5 to 10 inclusive is shown a modification in the form of the nose structure. This modified form is preferable where it is desired to use aluminum in the tank structure in order to decrease the weight of the vehicle. From the rear of the vehicle up to the forward-most tank head the structure is the same as that previously described except that the members including, if desired, plates 10, 11, 12 and 13 and angles 16, 17, 18 and 19 are made of aluminum or similar light material.

The forward head 24 is replaced by a head 80 formed as shown in Fig. 10, in three pieces providing slots $a$ for the passage of side plates 11 and 13, which in this construction are extended into the nose portion and converged to the nose post as later described, and with angular slots $b$ for the passage of angles 16, 17, 18 and 19, tabs $c$ are left to cover the ends of the flanges of the plates 10 and 12.

As best shown in Figs. 5 and 6, the angle members 16, 17, 18 and 19 extend only a short way beyond head 80. Connected to the respective ends of these angle members are steel angles 81, 82, 83 and 84. The details of a suitable connection of the steel angles to the aluminum angles is shown in Fig. 9, which shows the extended end of angle 17. The flange 14 of plate 11 is continued to the end of the angle 17 at which point it is cut away. The flange of plate 10 which does not pass through head 80 is replaced by a short piece of steel angle 85. A similar piece of steel 86 is positioned on the outside of lower angle 17 and extends a short distance down the side of plate 11. Rivets 87 pass through angle 17, the interposed member 85 and flange 14 and member 86 to securely and rigidly clamp the assembly. Steel angle 82 is riveted to member 85 at 89 and extends forwardly with the now flangeless plate 11 to the prow post as later described. Angle 82 is riveted at 90 to plate 11 at suitable intervals. It will be understood that angles 81, 83 and 84 are respectively secured to angles 16, 18 and 19 in an identical manner with that just described for the connection angles 17 and 82.

A vertical, centrally positioned aluminum plate 91 is welded to the tank head 80 and extends forwardly to the nose post 72 which is of steel. Aluminum angles 92 and 93 are welded along the top and bottom edges respectively of plate 91, and to the aluminum housing or shell 95 of the nose portion. Aluminum plates 11 and 13 with their steel reenforcing angles 81, 82, 83 and 84 converge as shown in Fig. 5 to plate 91 at the nose post 72. Plates 11 and 13 are welded to plate 91 and angles 92 and 93 at the post 72 while steel angles 81, 82, 83 and 84 are welded to the post 72.

The vertical plate 91 is cross braced adjacent head 80 and to the rear of angles 81, 82, 83 and 84, by two vertical aluminum plates 97 positioned on opposite sides of plate 91 and welded thereto and to plates 11 and 13. The edges of the plates 97 may be reenforced by aluminum angles 98 welded to the plates 97, the center vertical angles 98 being also welded to plate 91 (see Fig. 8) while the outside vertical angles are welded respectively to plates 11 and 13.

Welded to nose post 72 is a bent steel plate 100 to which steel angles 81, 82, 83 and 84 are welded and to which aluminum shell 95 is riveted at 101. The shell 95 is further supported by two curved brackets 102, best shown in Fig. 8, which are respectively riveted to angles 82—83 and 81—84 by rivets 103. Rivets 104 secure the shell 95 to the brackets.

The rear edge of shell 95 is welded to head 80 at 105, this weld being covered by the beading 76.

The shell 95 is open at the bottom and this opening is closed by a plate 107 bolted to angles 93 at 108 and to angles 83 and 84 at 109.

By the arrangement just described the nose portion is sufficiently reenforced with steel members so that the draft strains are received and properly distributed to the aluminum frame within the tank. It will be understood that various changes in the details of the construction may be made to meet changes in the materials used and that the invention is not limited to the details of construction shown in the drawings. The box girder member which forms the back-bone of the tank and chassis frame may be fabricated from plates of various shapes and sizes and in a manner to meet desired building or shop practice without departing from my invention.

What I claim is:

1. A tank vehicle in the form of a semi-trailer comprising a tank shell, a combined chassis and tank frame radially confined within the tank shell, said frame including a box-like girder fabricated from plates, the corner portions of said girder engaging the inside surface of the shell, said plates being provided with a plurality of apertures to permit a free flow of liquid within the tank, wheel mountings secured to the outside of the shell, and transverse frame members, confined within the shell, secured to the box-like girder and positioned in alignment with the wheel mountings.

2. A tank vehicle in the form of a semi-trailer comprising a tank shell and tank heads, a combined chassis and tank frame radially confined within the tank shell and extending through the forward tank head, said frame including a box-like girder fabricated from plates, said plates being provided with a plurality of apertures to permit a free flow of the liquid within the tank, and a nose frame secured to the forward end of the tank and chassis frame beyond the foremost tank head, said nose frame including a prow post for coupling the tank vehicle to a tractor.

3. A tank vehicle in the form of a semi-trailer comprising a tank shell, a combined chassis and tank frame positioned within the tank shell, said frame comprising a plurality of plates connected together to form a rectangular box-like member extending lengthwise of the shell with the corner portions of said member engaging the inside surface of the shell, said plates being provided with a plurality of apertures to permit a free flow of liquid in the tank, the forward ends of at least a portion of said plates having their forward ends extended beyond the forward end of the tank, members connected to said extended portions and converged toward and secured to a prow post adapted to be coupled to a tractor, vertical transverse members extending between the plates and the inside surface of the shell, and wheel mountings secured to the outside of the shell in line with said vertical transverse members.

4. A tank vehicle in the form of a semi-trailer comprising a tank shell, a combined chassis and tank frame positioned within the tank shell, said frame comprising vertical and horizontal plates connected together at their edges to form a rectangular box member extending lengthwise of the shell with the corners of said member engaging the inside surface of the shell, said plates being provided with a plurality of apertures to permit a free flow of liquid in the tank, the vertical side plates being extended through the forward end of the tank and converged toward and secured to a prow post adapted to be coupled to a tractor, vertical transverse members extending between the plates and the inside surface of the shell, and wheel mountings secured to the outside of the shell in line with said vertical transverse members.

5. A tank vehicle in the form of a semi-trailer comprising a tank shell, a combined chassis and tank frame positioned within the tank shell, said frame comprising vertical and horizontal plates connected together adjacent their edges to form a rectangular box member extending lengthwise of the shell with the corners of said member engaging the inside surface of the shell, said plates being provided with a plurality of apertures to permit a free flow of liquid in the tank, the vertical side plates being extended through the forward end of the tank and converged toward and secured to a prow post adapted to be coupled to a tractor, vertical partition members positioned intermediate the ends of the tank dividing the tank shell into two tank compartments, vertical transverse members positioned in the rear compartment and extending between the plates and the inside surface of the shell, and wheel mountings secured to the outside of the shell in line with said partition members and transverse members.

6. A tank vehicle in the form of a semi-trailer comprising a frame including vertical side plates and horizontal top and bottom plates connected along their edge portions to form a rectangular box member, front and rear tank heads and intermediate tank heads welded to the frame, a tank shell telescoped over said frame and welded to said heads to form a multi-compartment tank, the vertical side plates of the frame extending through the front tank head and being converged toward and connected to a prow post adapted to be coupled to a tractor, transverse members positioned in the rearmost tank compartment and extending between the plates and the inner surface of the shell and wheel mountings secured to the outside of the tank in position to cooperate with said transverse members and the intermediate tank heads.

7. A tank vehicle in the form of a semi-trailer comprising a frame including vertical side plates and horizontal top and bottom plates connected along their edge portions to form a rectangular box member, longitudinally positioned reenforcing members secured along the edge portions of the box member, front and rear tank heads and intermediate tank heads welded to and forming part of the frame, a tank shell telescoped over said frame and welded to said heads to form a multi-compartment tank, the longitudinal reenforcing members being extended through the front tank head and converged toward and connected to a prow post adapted to be coupled to a tractor, transverse members positioned in the rearmost tank compartment and extending between the plates and the inner surface of the shell, and wheel mountings secured to the outside of the tank in position to cooperate with said transverse members and said intermediate tank heads.

8. In a tank vehicle in the form of a semi-trailer comprising a frame formed of aluminum or the like and including vertical side plates and horizontal top and bottom plates connected along their edge portions to form a box member generally rectangular in cross section, longitudinally positioned reenforcing members secured along the edge portions of the box member, front and rear tank heads and intermediate tank heads welded to and forming part of the frame, a tank shell telescoped over said frame and welded to said heads to form a multi-compartment tank, the side plates being extended through the front tank head and converged toward and connected to a prow post, and steel reenforcing members secured to the extended portions of the plates and to the prow post.

9. In a tank vehicle of the semi-trailer type, a frame formed of aluminum or the like and including vertical side plates and horizontal top and bottom plates connected along their edge portions to form a box member generally rectangular in cross section, longitudinally positioned reenforcing members secured along the edge portions of the box member, front and rear tank heads and intermediate tank heads welded to said plates and reenforcing members to form part of the frame, a tank shell telescoped over said frame and welded to said heads to form a multi-compartment tank, the side plates being extended through the front tank head and converged toward and connected to a prow post, the longitudinal reenforcing members being extended a short distance through the front tank head, and steel reenforcing members spliced to the extended ends of said longitudinal reenforcing members and secured to the upper and lower edges of the extended portions of the side plates and having their forward ends welded to the prow post.

10. In a tank vehicle, of the semi-trailer type, a frame formed of aluminum or the like and including top, bottom and side plates connected along their edge portions to form a box member generally rectangular in cross section, longitudinal reenforcing members secured along the edge portions of the box member, front and rear tank heads and intermediate tank heads welded to said plates and reenforcing members to form parts of the frame, the side plates being extended through the front tank head and converged toward and connected to a prow post, the longitudinal reenforcing members being extended a short distance through the front tank head, steel reenforcing members spliced to the extended ends of said longitudinal reenforcing members and secured along the upper and lower edges of the extended portions of the side plates and having their forward ends welded to the prow post, and a vertical plate formed of aluminum or the like positioned intermediate the extended portions of the side plates, the rear end of said vertical plate being welded to the forward tank head and its forward end being connected to the prow post.

11. In a tank vehicle of the semi-trailer type, a frame including top, bottom and side plates connected along their edge portions to form a box-like member, forward and rear tank heads welded to the plates, said side plates being extended through the forward tank head and converged toward and connected to a prow post, and a substantially vertical plate positioned intermediate the extended portions of the side plates, the rear end of said vertical plate being welded to the forward tank head and its forward end being connected to the prow post.

HUGH A. ROBINSON, SR.